(No Model.) 2 Sheets—Sheet 1.
E. A. KOCH.
PLOW.
No. 493,168. Patented Mar. 7, 1893.
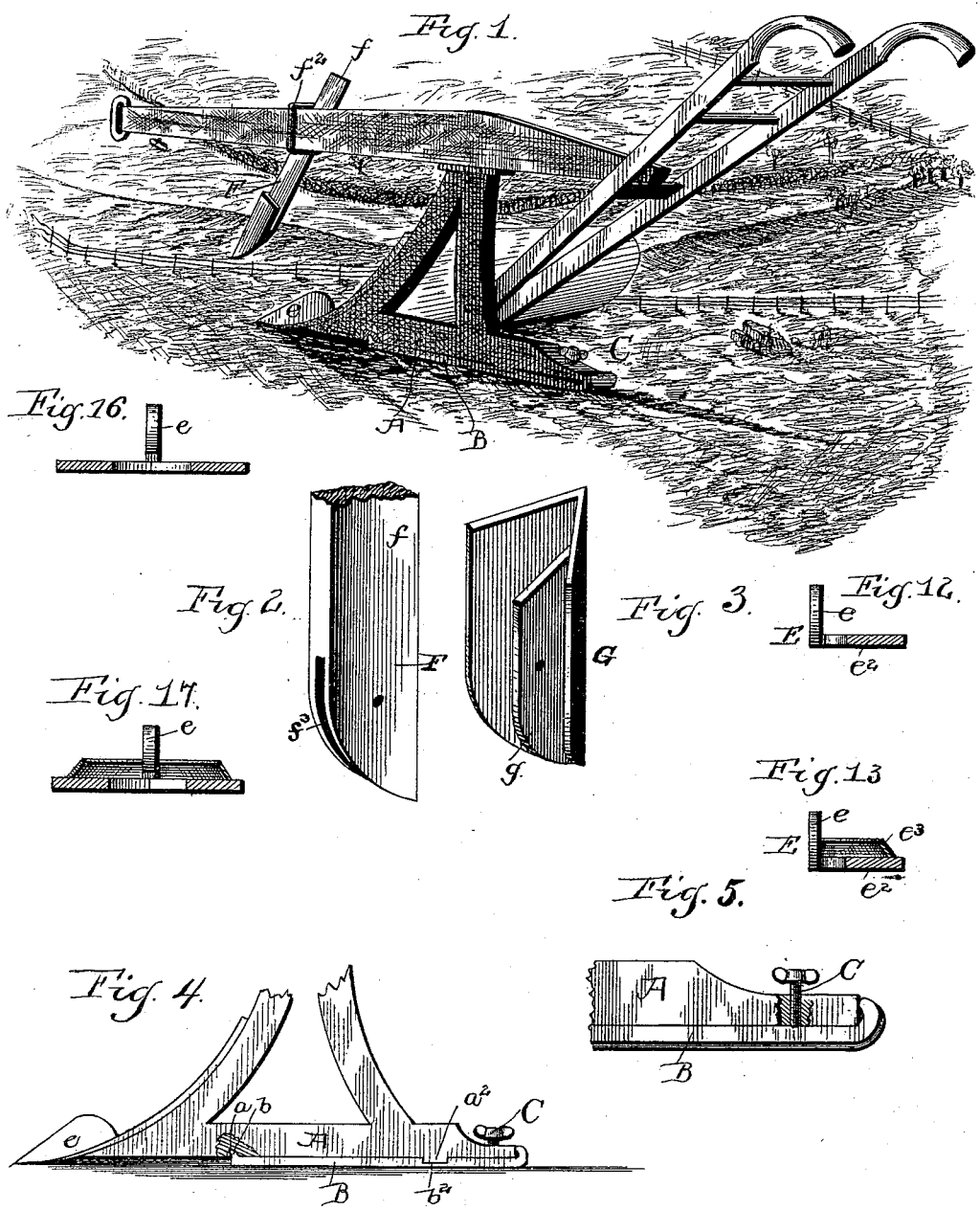
Witnesses
H. G. Seitz
Daniost. Mead.
Inventor
Edouard Alphonse Koch,
by R. S. Dykenforth
his Attorney (No Model.) 2 Sheets—Sheet 2.

E. A. KOCH.
PLOW.

No. 493,168. Patented Mar. 7, 1893.

Witnesses
H. G. Seitz
David H. Mead

Inventor
Edouard Alphonse Koch,
by R. G. Dyrenforth
his Attorney

UNITED STATES PATENT OFFICE.

EDOUARD ALPHONSE KOCH, OF WATERLOO, LOUISIANA.

PLOW.

SPECIFICATION forming part of Letters Patent No. 493,168, dated March 7, 1893.

Application filed May 15, 1889. Serial No. 310,919. (No model.)

*To all whom it may concern:*

Be it known that I, EDOUARD ALPHONSE KOCH, the above-named petitioner, residing at Waterloo, in the parish of Pointe Coupée and State of Louisiana, have invented certain new and useful Improvements in Plows; and I hereby declare the following to be a full, clear, and exact description of the invention, such as will enable others skilled in the art to make and use the same.

This invention relates to an improvement in plows.

One object of the invention is to provide a plow in which the share, and with it the beam, may be readily raised and lowered without having to shift the back-band of the draft animal or animals, or to raise or lower the plow by the handles; a further object is to provide a plow having a peculiar form of share, which may be readily removed, when desired, for the purpose of repair or otherwise; a further object is to provide a removable share for the plow-body and the colter, adapted to protect these parts from wear; and, finally to provide a plow having a removable share which may be held in place without the employment of any form of fastening device, as bolts, rivets, &c.

With these objects in view, the invention consists in a plow having the under face of the landside provided with an adjustable shoe; furthermore, in a plow having the under face of the landside provided with an adjustable shoe and the mold-board provided with a removable share adapted to extend beyond the end and the side of the mold-board, whereby to protect the said body from wear.

Figure 6:
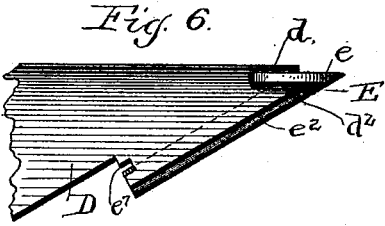
Figure 7:
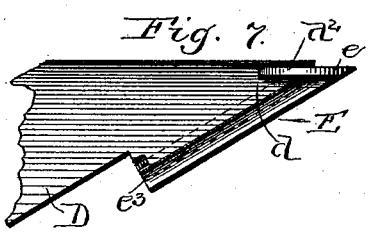
Figure 10:
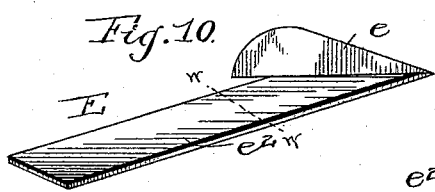
Figure 11:
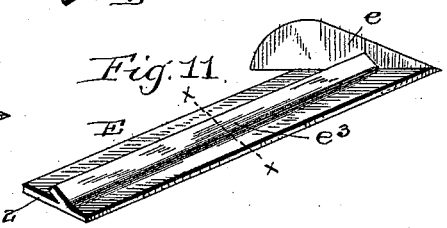
Figure 8:
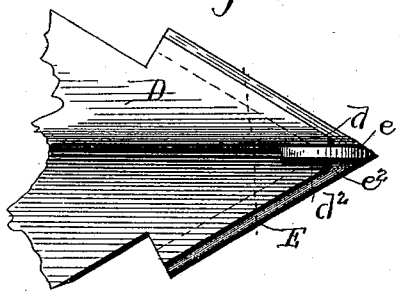
Figure 9:
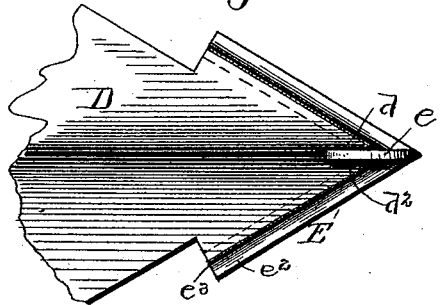
Figure 14:
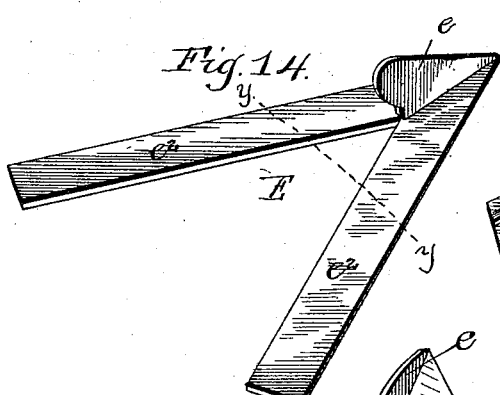
Figure 15:
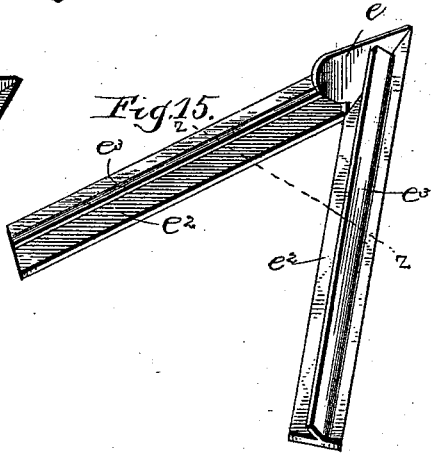

In the accompanying drawings, forming part of this specification and in which like letters of reference indicate corresponding parts in the several figures:—Figure 1—is a perspective view of a plow taken from the landside, showing the adjustable shoe, and also the share. Fig. 2— is a similar view of the lower portion of the shank of the colter. Fig. 3— is a detached perspective view of the colter-share. Figs. 4 and 5— are elevations of portions of the landside, showing more particularly the mechanism for adjusting the shoe carried thereby. Figs. 6 and 7— are plan views of a portion of the plow body of a single plow, showing the share in position. Figs. 8 and 9— are similar views of a portion of the plow-body of a double plow, showing the share in position. Figs. 10 and 11— are detached perspective views of the two forms of single shares illustrated in Figs. 6 and 7. Figs. 12 and 13— are cross-sections taken on the lines $w$—$w$, and $x$—$x$ of Figs. 10 and 11 respectively. Figs. 14 and 15—are detached perspective views of the two forms of the double share illustrated in Figs. 8 and 9. Figs. 16 and 17—are cross-sections taken on the lines $y$—$y$, and $z$—$z$, of Figs. 14 and 15 respectively, and Fig. 18— is a perspective view of a modified form of share.

Referring to the drawings, A designates the landside, which is provided near its front end with a recess $a$, and near its rear end with a lug or projection $a^2$.

B designates a runner or shoe having at its front end a toe $b$ designed to engage the recess $a$, its rear portion having a recess $b^2$ adapted to engage the lug $a^2$. The share is held in place by means of a screw C which engages a threaded opening in the landside and is swiveled in the shoe, and by means of this screw, the shoe may be moved to or from the landside, thus regulating the dip of the share or plow-point.

D designates the mold-board, which may be either single or double. The mold-board is provided at its front end $d$ with a slot or cleft $d^2$ designed to be engaged by the point $e$ of the share E, as clearly shown in Figs. 6, 7, 8, and 9, which point is held in position by frictional contact with the walls of the cleft. In the first two of the above-mentioned figures, a single mold-board is shown, and in the last two, a double mold-board is shown. The base $e^2$ of the share is arranged at an angle to the point $e$ corresponding to the angle at which the mold-board is arranged to the landside, and also extends beyond the mold-board in order that the lower edge of the mold-board will be protected from wear as well as the end $d$.

In Figs. 10 and 14, the bases of the shares are shown as being perfectly smooth that is, without any surface or projection for engaging the edge or edges of the mold-board to prevent any lateral play of the share when the plow is in use. In light, sandy soil, this construction will be found to answer all requirements; but in heavy and stony soil, provision should be made whereby to brace the base or bases of the share against lateral strain and also to assist in holding the share in proper position with relation to the moldboard. In Figs. 11 and 15, a preferred manner for accomplishing this result is shown, which consists in providing the base of the share with a flange or with flanges $e^3$ extending parallel with its edges. The flanges are, by preference, inclined inward, in order that they may closely embrace the moldboard when in position, so as to hold the share in place, and also to render the movement of the plow through the soil as easy as possible; but it is to be understood that, if desired, the flanges may extend at right angles to the base of the share. Thus by means of the point $e$ in the construction shown in Figs. 6 and 8, the share is held firmly in place against backward displacement from the resistance of the soil, or from the jar and impact occasioned by the share coming in contact with stones, roots, &c.; and by means of the point $e$ and flanges $e^3$, shown in Figs. 7 and 9, the share is braced against both lateral and longitudinal displacement. In both cases, however, the use of bolts, rivets, or other equivalent forms of fastening devices is unnecessary to keep the share in position.

Figure 18:
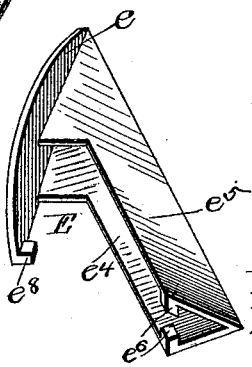

In the modification illustrated in Fig. 18, the share is shown V-shaped in cross-section and is adapted to fit on the edge of the moldboard, the side $e^4$ corresponding to the base $e^2$ of the other forms of share, and the side $e^5$ to the flanges $e^3$. The rear portion of the share is provided with lugs $e^6$ designed to be sprung into a recess $e^7$ in the mold-board, (Fig. 6,) and the rear end of the point $e$ is provided with a lug $e^8$ designed to engage the under face of the mold-board to hold the share in place. If desired, this form of share may be adapted to double plows by an obvious change in construction.

The colter F is secured to the plow-beam by a shank $f$ and strap $f^2$, and is bifurcated at its lower end as at $f^3$, to receive a fin or flange $g$ of the colter-share G. This share is by preference V-shaped in cross-section and is secured to the colter-shank by means of a bolt which passes through suitable openings in the two parts, so that it may be readily removed when desired.

It is to be understood that the peculiar forms of shares described are equally applicable to other tilling implements, and as their application is obvious, a detailed description is deemed unnecessary.

Having thus described my invention, what I claim as new, and desire to secure by Letters Patent, is—

1. In combination with a plow having a cleft, a cutting-blade or share provided with a colter at an angle thereto and integral therewith, substantially as described.

2. A cutting-blade for a plow or cultivator having a flange at its front end designed to engage a cleft and a base or cutting portion extending beneath the plow, the flange being at an angle to the cutting-portion, substantially as described.

3. A cutting-blade for a plow or cultivator having a flange arranged at an angle to the base or cutting portion at its front end designed to engage a cleft the base or cutting portion extending beneath the mold-board and beyond the edge thereof, substantially as described.

4. A plow having a landside provided near its front end with a recess and near its rear end with a lug or projection in combination with a shoe having a toe engaging the recess in the landside and a recess for reception of the lug, substantially as described.

5. A plow having a landside provided near its front end with an inclined recess and near its rear end with a lug or projection in combination with a shoe having a toe engaging the recess in the landside and a recess for reception of the lug thereof, substantially as described.

6. A plow having a landside provided with a recess near its front end and a lug or projection near its rear end in combination with a shoe having a toe engaging said recess in the landside and a recess for reception of the lug thereof and a screw in the landside having its end swiveled in the shoe, substantially as described.

In testimony whereof I affix my signature in presence of two witnesses.

EDOUARD ALPHONSE KOCH.

Witnesses:
R. G. DYRENFORTH,
F. B. KEEFER.